H. C. GILBERT.
COMBINED ORE CLASSIFIER AND JIG.
APPLICATION FILED MAR. 19, 1912.
1,055,737.
Patented Mar. 11, 1913.
3 SHEETS—SHEET 1.
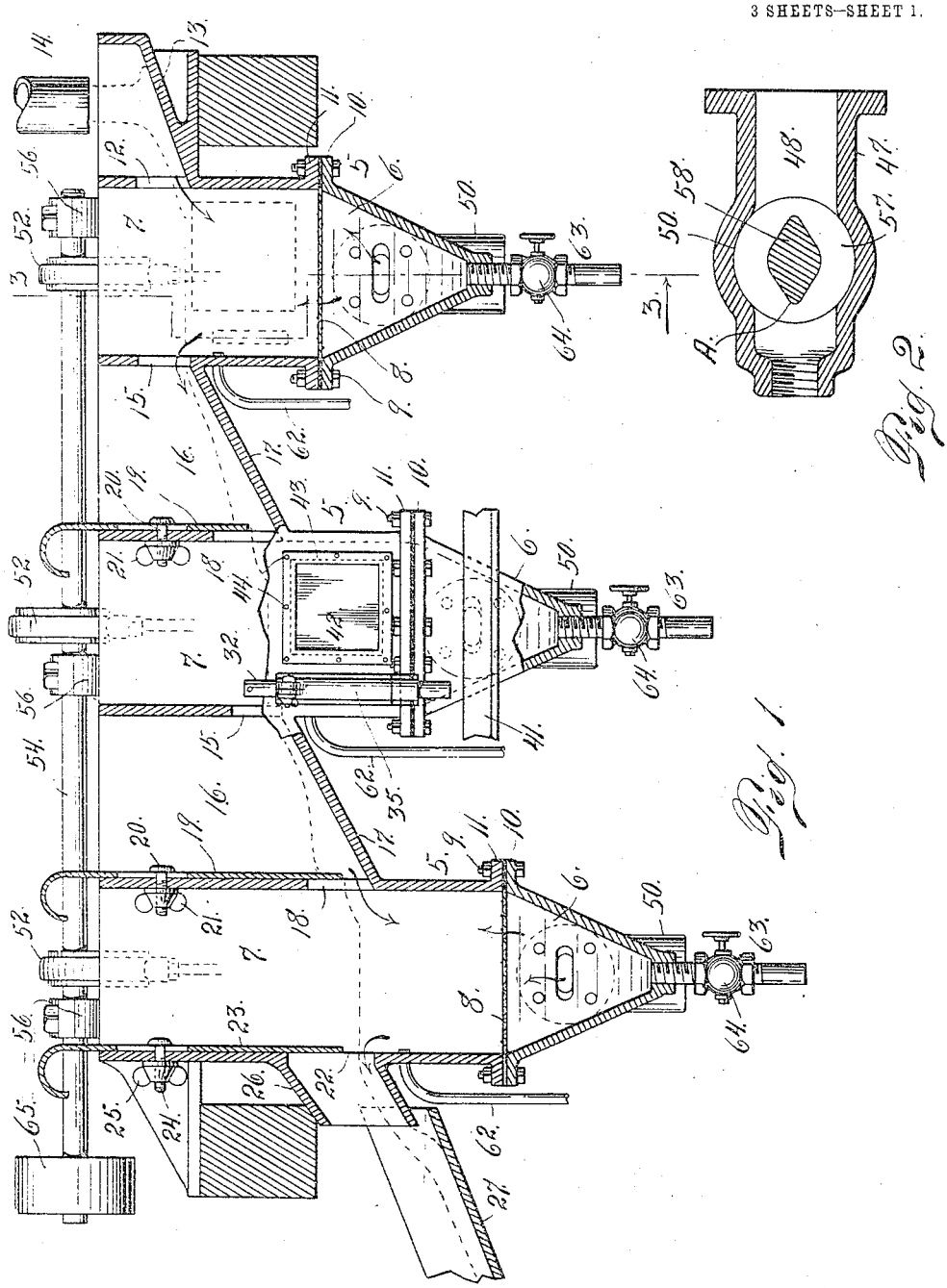
Witnesses
Ott E Hoddick
C H Rosener
Inventor
Hammond C. Gilbert.
By
Attorney

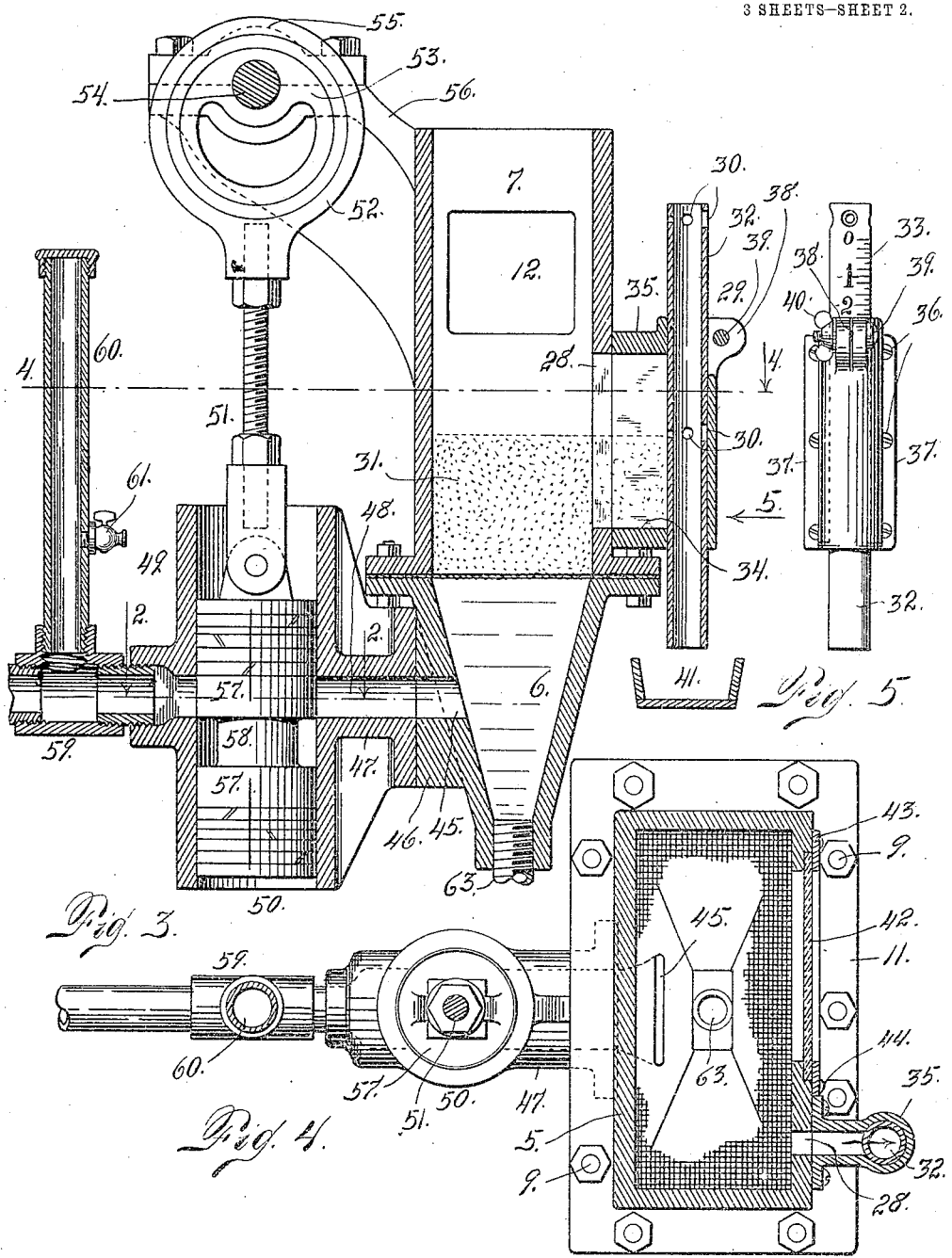

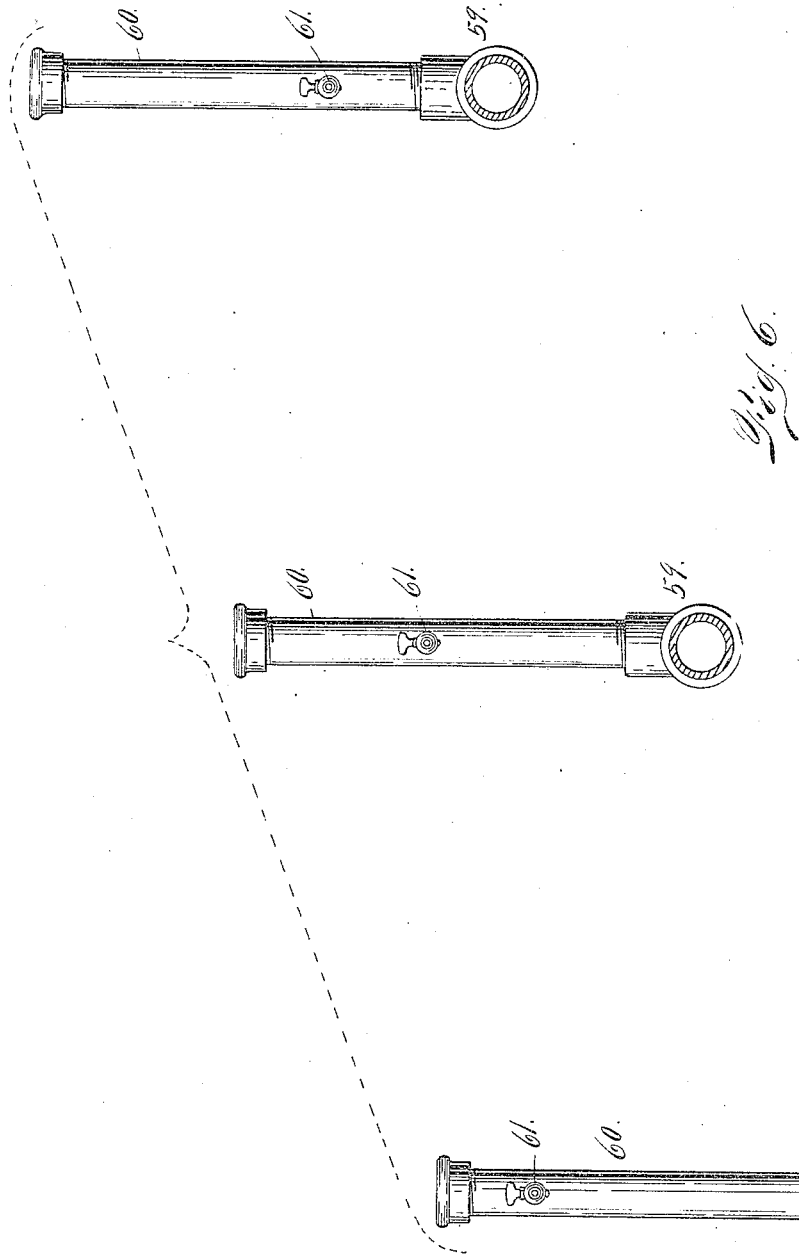

UNITED STATES PATENT OFFICE.

HAMMOND C. GILBERT, OF DENVER, COLORADO.

COMBINED ORE CLASSIFIER AND JIG.

1,055,737.

Specification of Letters Patent. Patented Mar. 11, 1913.

Application filed March 19, 1912. Serial No. 684,916.

*To all whom it may concern:*

Be it known that I, HAMMOND C. GILBERT, a citizen of the United States, residing in the city and county of Denver and State of Colorado, have invented certain new and useful Improvements in Combined Ore Classifiers and Jigs; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in combined ore classifiers and jigs. In fact, the greater portion of the product obtained from my improved construction is in the form of concentrates requiring no additional concentrating treatment. There is, however, a relatively small portion of the material from each compartment which contains values mixed with the gangue to such an extent as to constitute a sort of middlings product which requires treatment by suitable concentrating apparatus.

My improved construction constitutes a number of chambers arranged in alinement whereby each after the first receives an overflow from the other, the overflow from the last chamber of the series constituting gangue or material completely impoverished of its mineral values. Each chamber has a hopper-shaped lower compartment which is separated from the upper compartment by a mesh diaphragm. The water enters the lower compartment or hutch approximately midway between the bottom of the compartment and the mesh diaphragm and passes upwardly into the upper chamber where it comes in contact with the pulp to be treated, the same being originally fed to the upper compartment of the first chamber, the material in the upper compartments of the successive chambers being supplied by the overflow from adjacent chambers, the overflow passing to the chambers through gate-controlled openings.

The water which performs the classifying and concentrating function is introduced into the lower compartments of the different chambers intermittently, the supply-pipes being provided with air-chambers or columns into which the water rises as it is cut off from the units of the apparatus. In other words, the water in the supply-pipe is under sufficient pressure to cause it to rise and compress a body of air in the upper part of the column, which body of air re-acts upon the body of water to drive it with considerable force into the lower compartment of each unit or chamber of the system. The intermittent supply of water is obtained in my improved construction by the employment of a reciprocating valve consisting of a plunger whose central portion is reduced to allow the passage of water from the supply-pipe to the port or opening in the lower compartment of each chamber.

In the operation of my improvement, a suitable bed of material is maintained in the lower part of each upper compartment, the same resting upon the mesh diaphragm, and through which the water passes for classifying and concentration purposes. Furthermore, in the operation of this construction, I supply the different chambers with water under unequal pressures, the pressure being greatest in the first chamber, less in the next chamber, and so on, diminishing in pressure toward the last chamber, where the pressure is least of all. The heaviest concentrates as well as the coarsest classified product are obtained in the first chamber, the grades diminishing respectively in specific gravity and coarseness toward the last chamber. The heaviest portion of the concentrates is found in the lower part of the lowermost compartment of each chamber, while the next grade of concentrates passes from the upper compartment of each chamber through an adjustable gate so regulated that after the apparatus is well started, the concentrates are removed from the upper chamber substantially as fast as new material is supplied to the chamber, thus maintaining a uniform or approximately uniform bed of material upon the mesh diaphragm of each chamber.

Having briefly outlined my improved construction, I will proceed to describe the same in detail, reference being made to the accompanying drawing in which is illustrated an embodiment thereof.

In this drawing: Figure 1 is a sectional view partly in elevation, illustrating a number of units or chambers constructed and arranged in accordance with my invention. Fig. 2 is a horizontal section taken on the line 2—2 Fig. 3. This section, however, cuts the plunger-valve intermediate its enlarged extremities or when the valve is in position to allow the water to flow to the lower compartment of one of the chambers. Fig. 3 is a vertical section taken through one of the chambers on the line 3—3 Fig. 1, the parts being shown on a larger scale. Fig. 4 is a horizontal section taken on the line 4—4 Fig. 3. Fig. 5 is a detail view of the longitudinally and rotatably adjustable tubular valve employed in removing the concentrates from the upper compartment of each chamber of my improved construction. Fig. 6 is a sectional view cutting the water-supply pipes between the air pipes and the reciprocating valves, the air-pipes being shown in elevation, the pipes being spaced to harmonize with the spacing of the several chambers with which they are employed.

The same reference characters indicate the same parts in all the views.

Let the numeral 5 designate each of the chambers of my improved construction, the said chambers being arranged in alinement (see Fig. 1). As illustrated in the drawing, the chambers from the first, into which the material to be treated is originally fed, to the last, progressively extend further downwardly, since the overflow which supplies the different chambers after the first must be lower in each successive chamber in order to give the necessary inclination to the bottom of the trough or launder through which the overflow passes from one chamber to the other. However, while I have shown the upper extremities of all the chambers as occupying the same plane, it must be considered that the upward extensions of the various chambers after the first, above the openings through which the overflow enters the said chambers, in reality performs no function in the operation but simply makes it practicable to arrange the slidable gates in such a manner that they are conveniently accessible for purposes of adjustment.

Each chamber is provided at its lower extremity with a hopper-shaped compartment 6 separated from the upper compartment 7 by a mesh-diaphragm 8, the two members of the chamber being connected by bolts 9 passed through adjacent flanges 10 and 11 between which the edges of the mesh diaphragm are securely clamped. In the casing of the upper compartment of the first chamber 5, or that farthest to the right in Fig. 1, is formed an opening 12 which leads from a sort of hopper 13 into which the pulp for treatment is discharged from a conduit 14. This material, when it enters the chamber-compartment 7, accumulates on the diaphragm 8 and as the water enters the lower compartment and passes up through the mesh-diaphragm and through the bed of material thereon, there is a constant overflow from the first chamber through an opening 15 into a launder 16 having an inclined bottom 17, which, as illustrated in the drawing, constitutes an integral casting with the second chamber 5, the overflow from the first chamber by way of the launder 16 entering the upper compartment of the second chamber through an opening 18 controlled by a slidable gate-valve 19 held in place by a set-screw 20 to which a wing-nut 21 is applied for securing the valve in any desired position of adjustment. There is a launder 16 between the second and third chambers of substantially the same construction as that between the first and second chambers, there being an overflow-opening 15 in the second chamber and an inlet opening 18 in the third chamber, the latter being controlled by a gate-valve 19 in the same manner and of the same construction as that used in connection with the second chamber heretofore described. The third, or last chamber of each series of chambers constituting an installation constructed in accordance with my improvement, is provided with a gangue-discharge opening 22 controlled by a gate-valve 23 slidably adjustable and held in place by a set-screw 24 to which a wing-nut 25 is applied. Extending exteriorly from the opening 23 is a discharge-nozzle 26 from which the gangue passes to a trough 27.

Each upper compartment 7 of each chamber has a relatively narrow vertically-disposed opening 28 through which concentrates are drawn off through a tubular valve 29 which is mounted on the front wall of the compartment and is adjustable both vertically and rotatably, the said valve being provided with orifices 30 of varying size, the valve being so adjusted as to cause the concentrate-discharge to pass through one or another of these openings according to the quantity of material which enters the compartment for treatment. the faster the feed the greater the discharge-opening required in order to maintain the bed of material 31 of uniform depth on the mesh diaphragm of each chamber. The vertical adjustment of this valve determines the depth of the bed of material upon the mesh diaphragm, since by virtue of this adjustment the orifices 30 may be caused to occupy a higher or lower position, depending upon the depth of the bed of material to be maintained on the diaphragm. The upper exposed portion 32 of the valve 29 is also provided with openings 30 arranged coincidently or in alinement with the openings 30 of the same size through which the concentrates pass so that the operator will understand from the location of the exposed openings 30, the exact position of the corresponding but concealed lower openings, and will thus be cognizant of the fact that the concentrate discharge is passing through a particular opening and will thus understand the relative quantity of such discharge. Furthermore, the upper exposed portion 32 of the tubular valve is graduated, as shown at 33 (see Fig. 5) to indicate the height of the lower openings 30 above the bottom 34 of the discharge-slot 28 of the chamber. In order to properly space the tubular valve from the chamber and facilitate the securing of the valve thereto, the valve is mounted on a bracket 35 which is secured to the chamber by means of screws 36 passing through flanges 37 with which the bracket is provided. The upper portion of the bracket is split, as shown at 38, whereby it may be tightened upon the tubular valve by means of a screw 39 and wing-nut 40. This tubular valve is open at the bottom to allow the concentrates which enter the same to pass downwardly into a trough 41.

The front wall of the upper compartment of each chamber is provided with an opening normally covered by a transparent plate 42 which is set in a frame 43 which is secured to the wall of the chamber by means of suitable fastening-devices 44. By virtue of this transparent plate the action of the rising current of water upon the bed of material carried by the mesh diaphragm may be observed.

The hopper-shaped wall of each of the lower compartments 6, is provided on its rear side with an opening 45, the wall of the compartment being reinforced as shown at 46 to fit a flanged member 47 having an opening 48 registering with the opening 45 of the compartment, this flanged member 47 being formed integral with an open-ended cylinder 49 in which is located a reciprocable plunger-valve 50 connected by means of a pitman 51 with the strap 52 of an eccentric disk 53 mounted on an operating shaft 54 journaled in boxes 55 carried by brackets 56 extending rearwardly from the walls of the upper compartments of the various chambers or units. This plunger 50 has extremities 57 which fill the cylinder, but is reduced intermediate its extremities, as shown at 58, to allow water to pass from a supply-pipe 59 to the openings 48 and 45 when the plunger is properly adjusted or when the plunger is making a stroke in either direction, the time during which the water passes during the making of each stroke being determined by the speed of the plunger, which may be regulated as desired, the movement of the plunger, however, being constant.

The water-supply-pipe 59 is provided adjacent the cylinder 49, constituting the casing of the plunger-valve, with an upwardly extending pipe 60 which is closed at the top and open at the bottom where it communicates with the supply-pipe. A small valve 61 is connected with this pipe at a suitable distance above the supply-pipe. When the passage between the supply-pipe and the openings 48 and 45 is closed by the plunger valve, the water which is under pressure as aforesaid in the supply pipe, rises in the pipe 60 against an air-cushion in the upper part of the pipe.

In starting the apparatus the valve 61 is left open until the water begins to leak therethrough, after which it is closed and an air-cushion is then known to be formed above the valve. The greater the pressure required upon the water when it enters the lower compartment of each chamber, the lower the valve 61 should be located and consequently the greater the depth of the air-chamber in the pipe 60.

Each upper compartment is provided just below its overflow outlet with a discharge pipe 62 through which classified or sized material passes from the various chambers to concentrators for treatment, the construction being so arranged that the coarsest grade of particles will pass from the first chamber, the said product or graded material diminishing in coarseness from the first to the last unit. This classified product contains sufficient gangue to require or justify its treatment by concentration. On the other hand, the material which is drawn off from the upper compartments through the tubular valve 29 and the material which accumulates in the compartments 6 of the various chambers, is practically a pure mineral product and therefore requires no further concentration. The lower extremity of each compartment 6 is provided with a discharge-pipe 63 provided with a normally-closed valve 64, through which the concentrates from the lower compartment may be either constantly or intermittently removed.

From the foregoing description, the use and operation of my improved construction will be readily understood. The shaft 54 is equipped with an operating-pulley 65 which may be connected with any suitable power for rotating the shaft 54 to reciprocate the plunger-valves 57 for controlling the supply of water to the lower compartments of the various chambers of the apparatus, the movement of the valves being imparted through the instrumentality of the eccentric disks 53, their straps 52 and pitmen 51. At the same time the material is fed constantly from the conduit 14 to the first unit, from that to the second unit and so on through the series. As the plunger-valve reciprocates, water from the supply-pipe 59 enters the lower compartment 6 of each unit every time the reduced portion 58 of the plunger is in register wholly or partially with the discharge passage leading from the pipe 59 to the said compartment. However, as the passage is cut off by the position of either of the enlarged extremities 57 of the plunger, the concentrates within both the upper and lower compartments of each unit are allowed or given time to fall or move downwardly in their compartments an appreciable distance, while at the same time the water rises in each of the tubes 60 and compresses the air in the upper part thereof. Then, as the reduced part of the plunger-valve is again brought into alinement with the water-passage to each compartment 6, the water enters the said compartment with a rush due to the action of the air-cushion in the upper part of each tube 60, thus producing a pulsating action of the water which performs an important function in the separation of the mineral from the gangue in a machine of this class.

As the water enters each compartment 6, it rises through the mesh diaphragm into the upper compartment 7 and carries the lighter material upwardly and causes the same to overflow from the first chamber to the second, from the second to the third, and so on to the last from which the overflow is practically pure gangue and goes to the dump. During this operation the heaviest concentrates are continually accumulating (assuming that the valves 64 are closed) in the lower compartment 6 of the different units, while the concentrates of less specific gravity are constantly passing from the upper compartment 7 through the tubular valve 29 into the trough 41. Furthermore, there is a classified product passing through the discharge-pipe 62 from the upper compartment 7 of each unit of the apparatus. In order to better distribute water in the lower compartment, the opening 45 through which it enters the said compartment is elongated horizontally, being of greater width than depth, thus introducing the water in a comparatively wide sheet. It is found in practice that this gives better results than where it is introduced in a cylindrical stream. The passage 48 communicating with the opening 45 is correspondingly shaped. In order that the plunger-valve may interpose as little resistance as possible to the flow of the water when the reduced pipe 58 is in alinement with the opening or passage 48 and the supply-pipe 59, the part 58 of this valve is elongated in the direction of the flow of the water, being inclined from its center to a point A in the direction from which the water enters. This peculiar shape spreads the entire stream and produces better results than if the reduced part were cylindrical in cross-section.

Referring to Fig. 6 of the drawing in which the valves 61 are shown located at varying distances above the water-supply-pipes 59, it must be assumed that the pipe farthest to the right supplies the chamber farthest to the right in Fig. 1, and that the other pipes shown in Fig. 6 respectively supply the other chambers, in the order illustrated in Fig. 1. In other words, it is assumed that the pipes 59 and the air-pipes 60, shown in Fig. 6, are employed in connection with three chambers arranged in the same order as disclosed in Fig. 1, the pipes, however, in Fig. 6 being spaced somewhat farther apart than the corresponding chambers in Fig. 1.

Having thus described my invention, what I claim is:

1. The combination of a number of vertically-disposed chambers separated by foraminous diaphragms into upper and lower compartments, means for feeding the material to be treated to the upper compartment of the first chamber, the upper compartments of the several chambers having overflow openings and each chamber after the first having an inlet-opening to receive the overflow from an adjacent chamber in the direction of the first chamber, the chambers after the first receiving the material to be treated from the overflow of another chamber, water-delivery pipes connected with the lower compartments of the respective chambers, and air-pipes leading upwardly from the respective water-pipes, the air-pipes being closed at the top, their lower extremities being in communication with the water-pipes, and valves located between the air-pipes and the chambers for intermittently cutting off the supply of water to the several chambers, said valves comprising cylinders and pistons, pitmen pivoted to said pistons, a power shaft, and means attached thereto at different angles for reciprocating said pitmen, whereby the water is caused to rise in the several air-pipes, producing pulsating currents.

2. In a stratifying separator, a draw-off comprising a tube vertically adjustable within a cylinder having a slot, open to the separator, said tube being also rotatable and having several openings of different sizes horizontally placed with respect to each other.

3. In a stratifying separator, a draw-off comprising a tube vertically adjustable within a cylinder, having a slot open to the separator, said tube being also rotatable and having several openings of different sizes horizontally placed with respect to each other, and a scale upon the upper exposed portion of said tube for indicating the distance of the openings above the bottom.

4. The combination with a series of stratifying separators arranged progressively as to height, means for conducting the overflow from each separator to the one next below, water conduits opening into the lower portions of said separators, means for causing pulsations of current in each conduit, vertical air-pipes attached to the conduits near the separators, each of said pipes being closed at the top and in communication at the bottom with the corresponding conduit and a valve in the side of each pipe, said valves being arranged progressively as to height throughout the series of separators, the valve used in connection with the highest separator being lowest in its pipe and that used in connection with the lowest separator being highest in its pipe, whereby the strongest pulsations will occur in the highest separator in which are found the heaviest ore particles.

5. The combination with a series of stratifying separators arranged progressively as to height, means for conducting the overflow from each upper separator to the one next below, water conduits opening into the lower portions of said separators, means for causing pulsations of current in each conduit, means in communication with each conduit near the separator for inclosing an air column, said means being arranged to provide the longest air column for the conduit emptying into the highest separator, and the shortest air column for the conduit emptying into the lowest separator whereby the strongest pulsations will occur in the highest separator in which are found the heaviest ore particles.

In testimony whereof I affix my signature in presence of two witnesses.

HAMMOND C. GILBERT.

Witnesses:
A. J. O'BRIEN,
A. E. ADAMS.